(12) United States Patent
Lin

(10) Patent No.: US 10,050,390 B1
(45) Date of Patent: Aug. 14, 2018

(54) LIGHT EMITTING POWER LINE PLUG HAVING A POWER CORD WITH A TRANSLUCENT CLADDING

(71) Applicant: Chia-Hua Lin, New Taipei (TW)

(72) Inventor: Chia-Hua Lin, New Taipei (TW)

(*) Notice: Subject to any disclaimer, the term of this patent is extended or adjusted under 35 U.S.C. 154(b) by 0 days.

(21) Appl. No.: 15/707,147

(22) Filed: Sep. 18, 2017

(51) Int. Cl.
| | |
|---|---|
| *H01R 3/00* | (2006.01) |
| *H01R 13/717* | (2006.01) |
| *H01R 24/28* | (2011.01) |
| *F21V 8/00* | (2006.01) |
| *H01B 7/02* | (2006.01) |
| *H01R 13/502* | (2006.01) |
| *H01R 103/00* | (2006.01) |

(52) U.S. Cl.
CPC ......... *H01R 13/7175* (2013.01); *G02B 6/001* (2013.01); *H01B 7/02* (2013.01); *H01R 13/502* (2013.01); *H01R 13/7172* (2013.01); *H01R 24/28* (2013.01); *H01R 2103/00* (2013.01)

(58) Field of Classification Search
CPC ...... H01R 3/00; H01R 13/502; H01R 13/717; H01R 13/7172; H01B 7/02; G02B 6/001
USPC ................................................ 439/488–491
See application file for complete search history.

(56) References Cited

U.S. PATENT DOCUMENTS

| | | | | |
|---|---|---|---|---|
| 9,373,921 | B1* | 6/2016 | Lin | H01R 25/003 |
| 9,620,903 | B2* | 4/2017 | Joo | H01R 13/652 |
| 2004/0042735 | A1* | 3/2004 | Ma | H01R 13/6641 |
| | | | | 385/88 |
| 2004/0071410 | A1* | 4/2004 | Ma | H01R 13/6641 |
| | | | | 385/88 |
| 2005/0124209 | A1* | 6/2005 | Currie | H01R 13/7172 |
| | | | | 439/490 |
| 2015/0346447 | A1* | 12/2015 | Wu | G02B 6/4416 |
| | | | | 385/101 |
| 2015/0364853 | A1* | 12/2015 | Thijssen | F21V 23/06 |
| | | | | 439/660 |
| 2017/0033514 | A1* | 2/2017 | Wang | H01R 13/7175 |

* cited by examiner

*Primary Examiner* — Chandrika Prasad
(74) *Attorney, Agent, or Firm* — WPAT, PC

(57) ABSTRACT

A light emitting power line plug structure is disclosed, comprising a plug accommodation body, an electric power line communicatively connected to the plug accommodation body, a plug front end assembly, a connection assembly fixedly locked to the plug front end assembly and a light emitting circuit assembly, wherein the light emitting circuit assembly is located between the plug front end assembly and the connection assembly, and is configured with at least a light emitting diode (LED) which faces towards the light guiding line extending from the inside of the electric power line; therefore, when the electric power cords in the electric power line conduct electric power, the LEDs in the light emitting circuit assembly can become conductive and emit light such that the light guiding line integrally illuminates by means of light transfers and glow outwards on the entire electric power line through the translucent cladding.

5 Claims, 7 Drawing Sheets

LIGHT EMITTING POWER LINE PLUG HAVING A POWER CORD WITH A TRANSLUCENT CLADDING

BACKGROUND OF THE INVENTION

1. Field of the Invention

The present invention generally relates to a light emitting power line plug structure; more specifically, it relates to a light emitting power line plug structure capable of allowing the light guiding line to integrally illuminate by means of light transfers upon conducting electric power such that the entire electric power line can glow outwards through the translucent cladding.

2. Description of Related Art

At present, household appliances draw electric power from the electric power sockets by using a plug, so the use of electricity has become a portion of everybody's family lives; additionally, in a generally known power outlet, there may be installed with a sort of light emitting device inside the plug accommodation body so as to provide light in the dark environment, thus indicating the location of the power outlet to the user.

But, since the electric power line and the power plug extending directly from the electronic device itself typically are unable to show whether the electric power has been conducted or not, it is quite desirable to install a sort of light emitting circuit inside the conventional electric power plug and to provide a light guiding line contained within the electric power line so that the light guiding line can extend from the electric power line to the electric power plug, such that, when the electric power plug is inserted into the power supply socket, the conductive connection of electricity from the power outlet can enable the light emitting components included in the light emitting circuit to illuminate, thereby allowing the light to travel into the light guiding line to transfer and glow; moreover, the electric power line may be made of translucent materials so the light emitted from the light guiding line can penetrate the electric power line thus allowing the user to see the illuminating power line, which may offer an optimal solution for the above-mentioned issues.

SUMMARY OF THE INVENTION

The light emitting power line plug structure according to the present invention comprises: a plug accommodation body, internally including an accommodation space; an electric power line, communicatively connected to the plug accommodation body, in which the electric power line is formed by means of a translucent cladding, the inside of the electric power line includes plural electric power cords and at least a light guiding line, and the front ends of the electric power cords and the light guiding line penetrate into the accommodation space, in which the front end of the light guiding line is combined with a stopper; a plug front end assembly, located within the accommodation space of the plug accommodation body, in which the plug front end assembly includes a seat body, at least two conductive plates are connectedly installed on the seat body, the conductive plates are electrically connected to the electric power cords in the electric power line, and also one side of the seat body is configured with an accommodation recess; a connection assembly, located within the accommodation space of the plug accommodation body and fixedly locked to the plug front end assembly, in which the connection assembly includes a positioning part, and the inside of the positioning part has a through hole going through the connection assembly; also, a positioning hole commutatively connecting to the through hole is further installed through the positioning part, and the front end of the light guiding line can enter the through hole such that the front end of the light guiding line can be fixed within the through hole by means of the stopper installed at the front end of the light guiding line; and a light emitting circuit assembly, installed in the accommodation recess of the seat body and located between the plug front end assembly and the connection assembly, in which the light emitting circuit assembly is configured with at least a light emitting diode (LED) facing towards the light guiding line within the through hole, and the light emitting circuit assembly includes at least two power supply cords respectively connected in parallel to the electric power cords in the electric power line such that, when the electric power cords in the electric power line conduct electric power, the LEDs of the light emitting circuit assembly can be electrically conducted and generate light and the light guiding line can integrally illuminate by means of light transfer feature so that the entire electric power line can glow outwards through the translucent cladding.

More specifically, the conductive plates connectedly installed on the aforementioned seat body include the central line conductive plate and the fire line conductive plate.

More specifically, the conductive plates connectedly installed on the aforementioned seat body include the central line conductive plate, the fire line conductive plate and the ground line conductive terminal.

More specifically, the light guiding line is a light fiber line material.

More specifically, a zigzag component is installed inside the light guiding line such that light can exhibit non-straight-lined transfers within the light guiding line.

More specifically, the connection assembly is further configured with a through hole penetrating the positioning part which can enter via a fixing pillar and press upon the light guiding line in the through hole such that the front end of the light guiding line can be fixedly positioned within the through hole.

DETAILED DESCRIPTION OF THE PREFERRED EMBODIMENTS

Figure 1A:
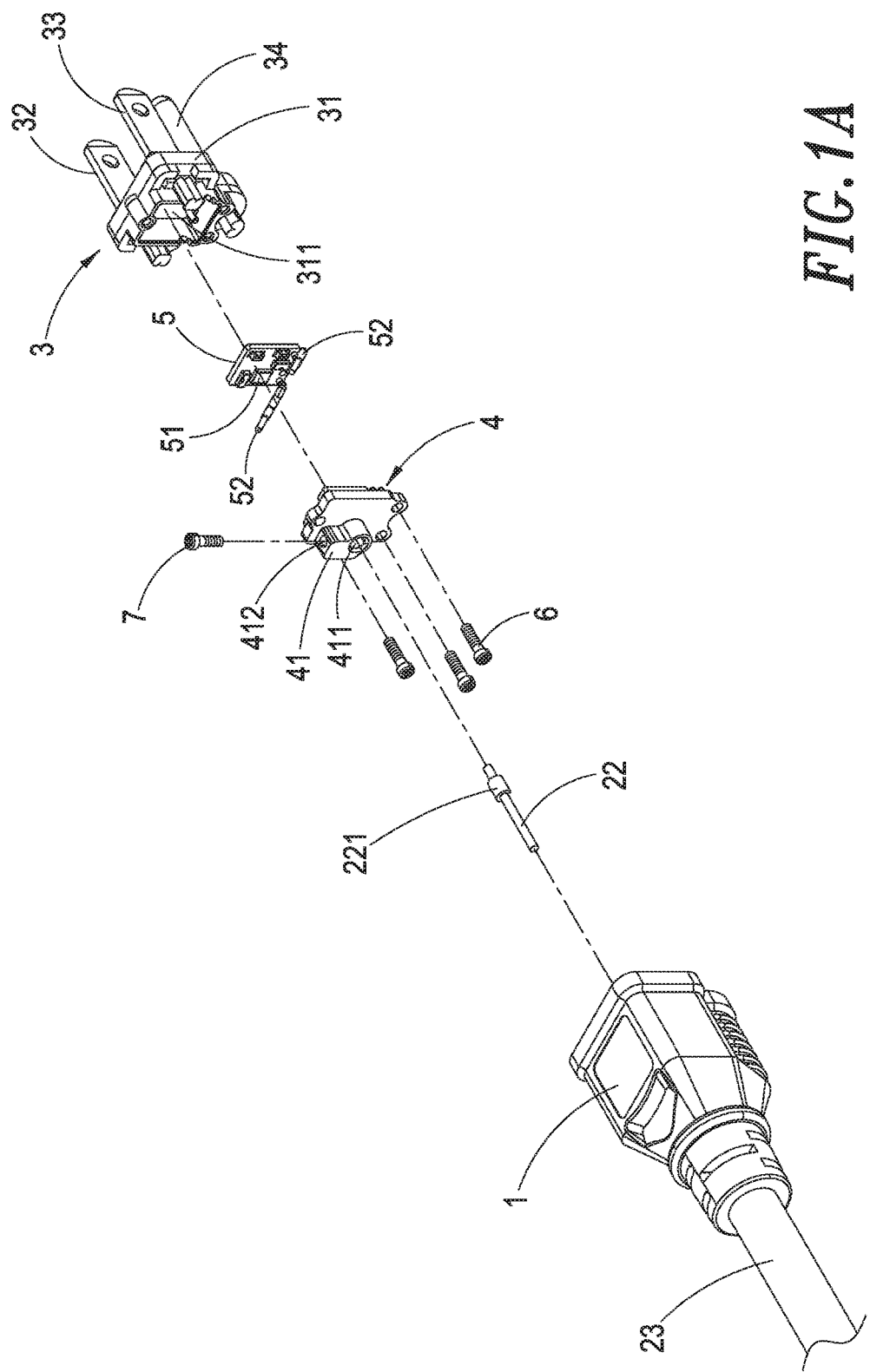
FIG. 1A shows a stereo structural disassembly view of the light emitting power line plug structure according to the present invention.
Figure 1B:
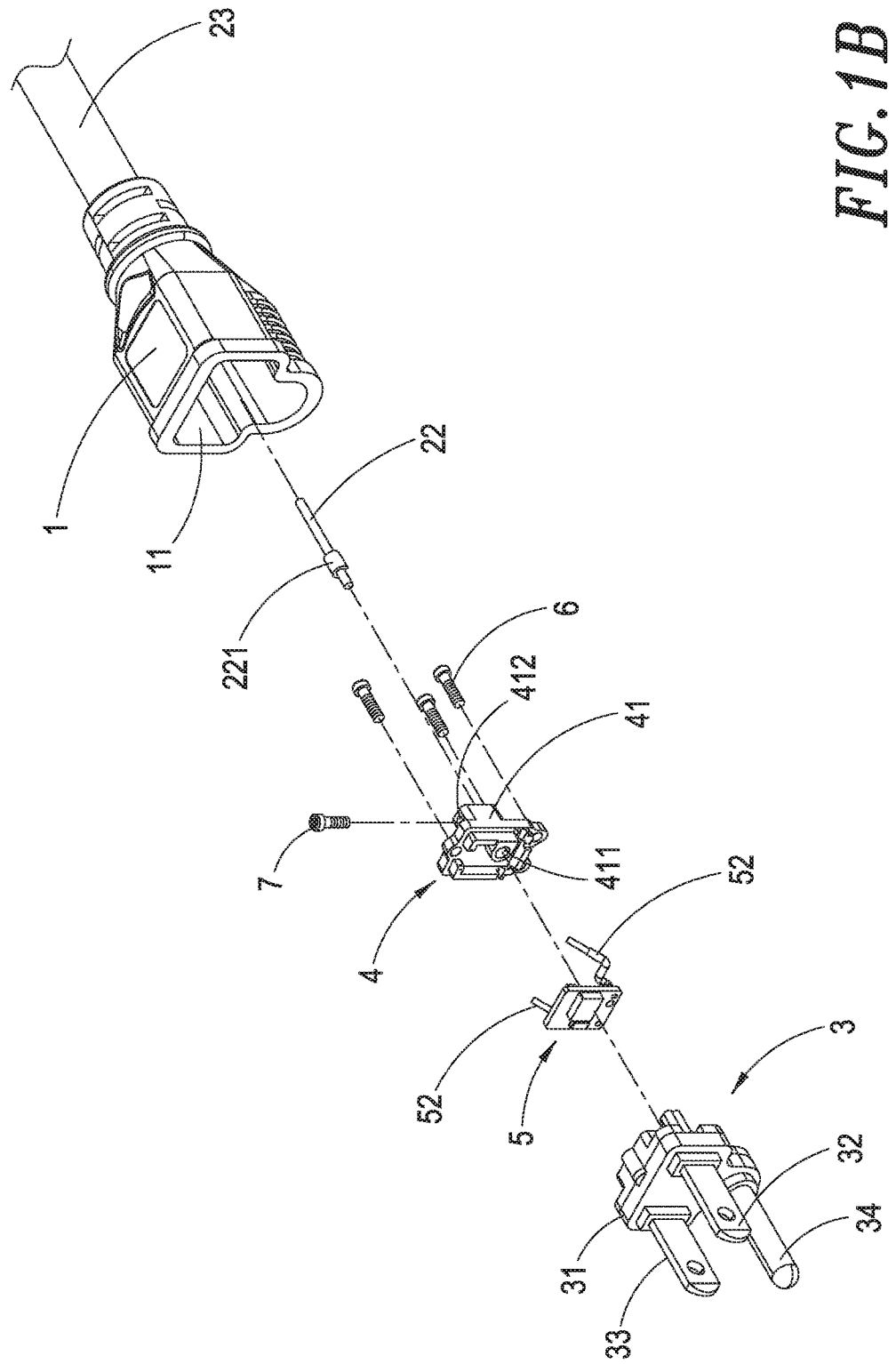
FIG. 1B shows a stereo structural disassembly view, observed from another angle, of the light emitting power line plug structure according to the present invention.
Figure 1C:
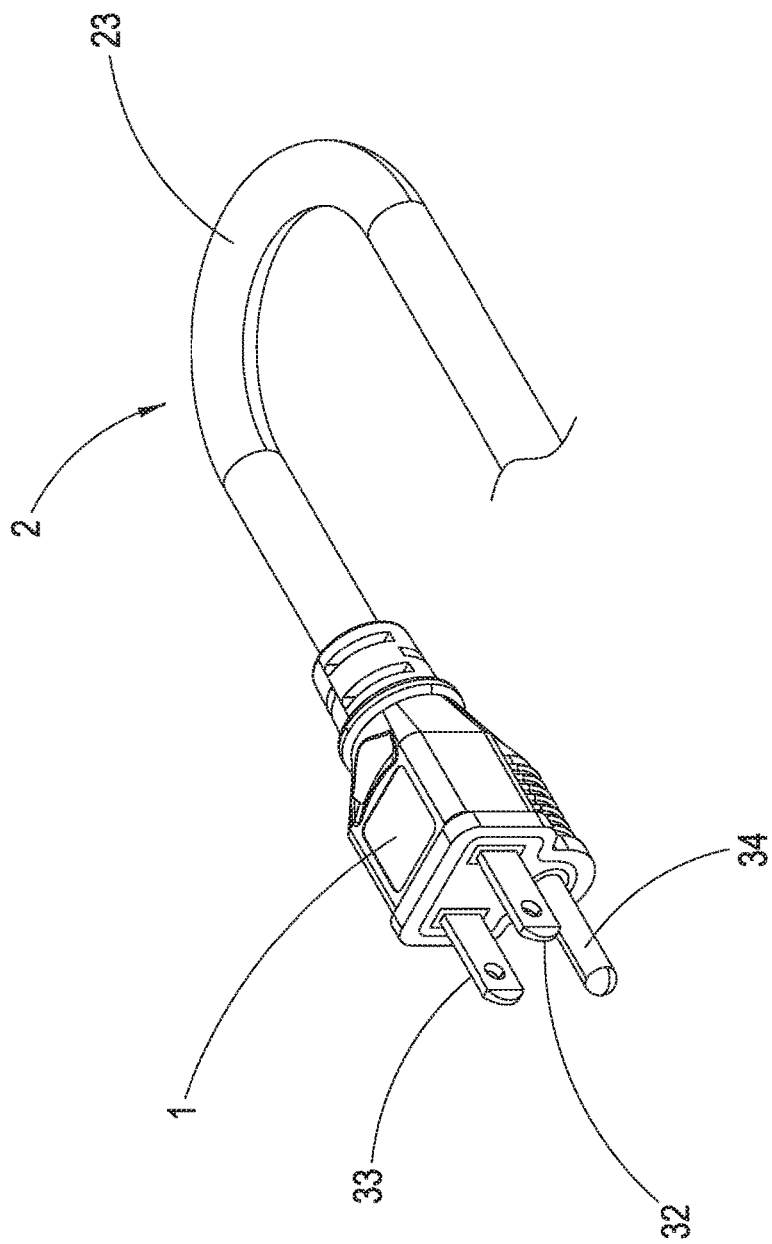
FIG. 1C shows a stereo structural assembly view of the light emitting power line plug structure according to the present invention.
Figure 1D:
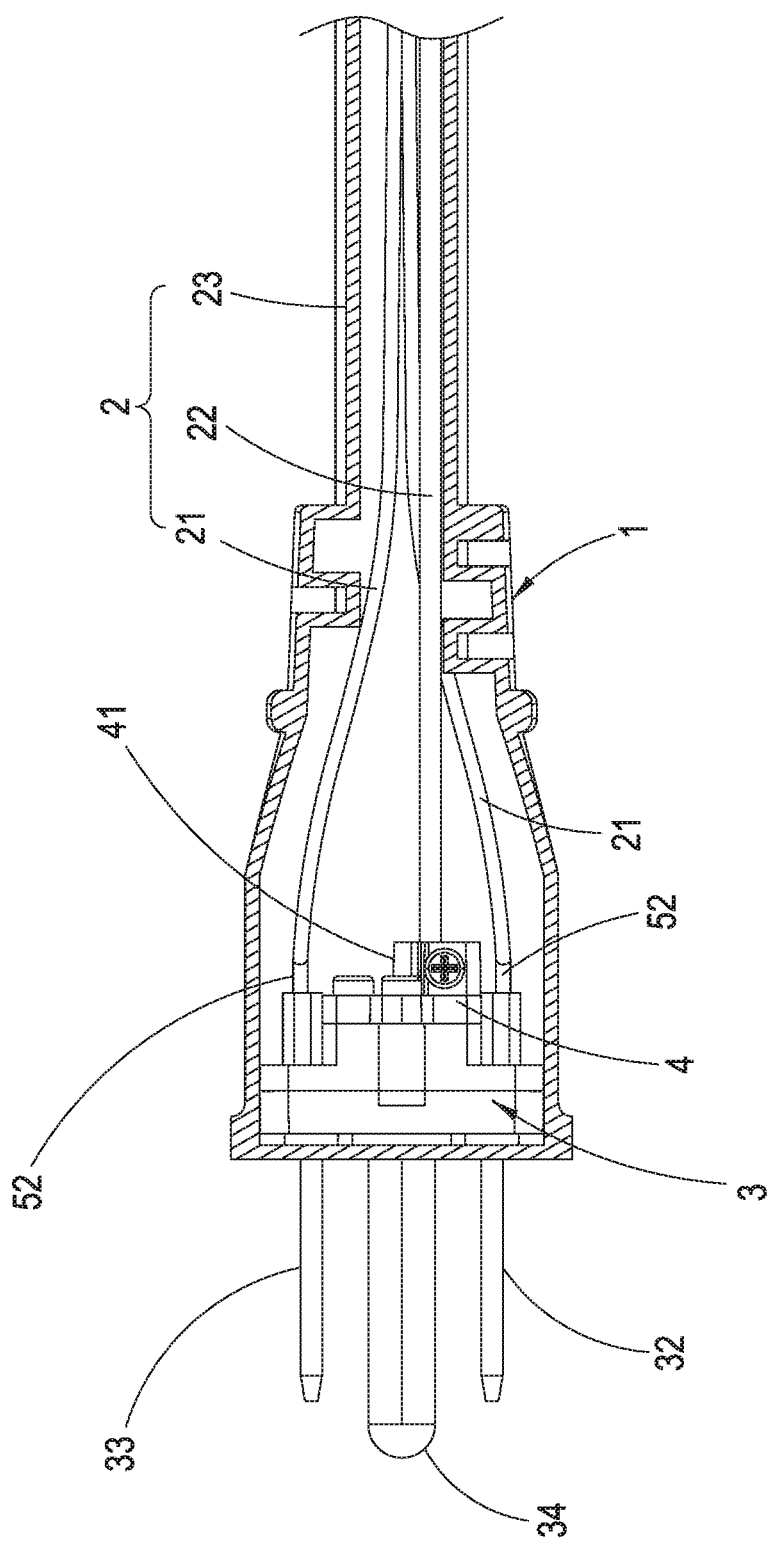
FIG. 1D shows a cross-sectioned structural view of the light emitting power line plug structure according to the present invention.
Figure 1E:
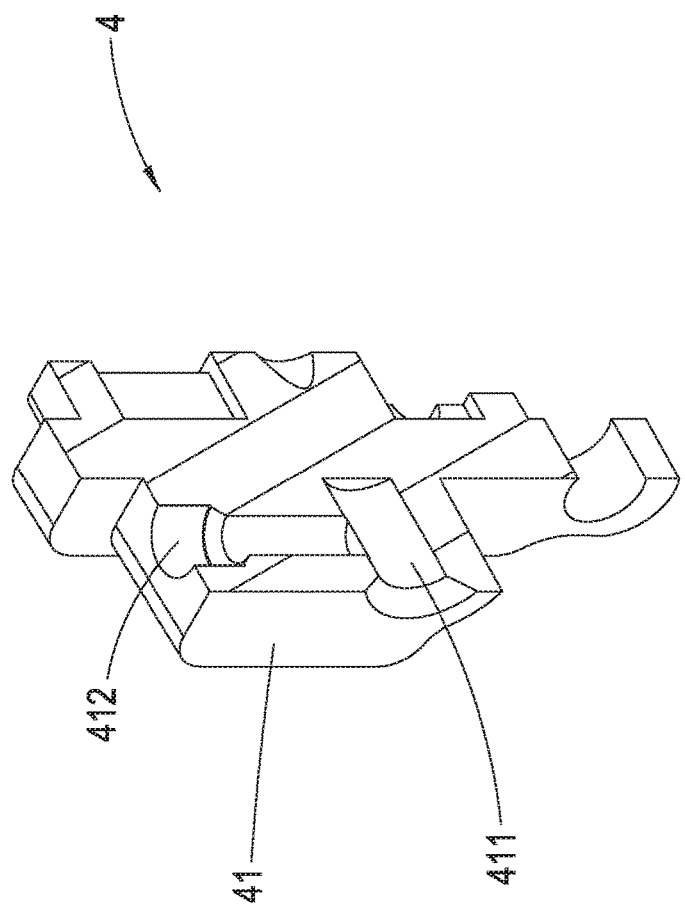
FIG. 1E shows a cross-sectioned structural view of the connection assembly in the light emitting power line plug structure according to the present invention.

Other technical contents, aspects and effects in relation to the present invention can be clearly appreciated through the detailed descriptions concerning the preferred embodiments of the present invention in conjunction with the appended drawings.

Initially, refer FIGS. 1A-1E, wherein a stereo structural disassembly view, a stereo structural disassembly view observed from another angle, a stereo structural assembly view and a cross-sectioned structural view of the light emitting power line plug structure according to the present invention are respectively shown. As depicted in the Figures, the illustrated light emitting power line plug structure comprises a plug accommodation body 1, an electric power line 2, a plug front end assembly 3, a connection assembly 4 and a light emitting circuit assembly 5.

Herein the plug accommodation body 1 internally includes an accommodation space 11, one end of the electric power line 2 is communicatively connected to the plug accommodation body 1, the electric power line 2 has plural electric power cords 21, at least a light guiding line 22 (in which the light guiding line 22 is made of a light fiber line material), and a translucent cladding 23, and the plural electric power cords 21 and the at least a light guiding line 22 are disposed inside the translucent cladding 23; also, the front ends of the electric power cords 21 and the light guiding line 22 penetrate into the inside of the accommodation space 11, and the front end of the light guiding line 22 is combined with a stopper 221.

Moreover, the inside of the accommodation space within the plug accommodation body 1 includes the plug front end assembly 3, the connection assembly 4 and the light emitting circuit assembly 5, wherein the plug front end assembly 3 includes a seat body 31 which is connectedly installed with a neutral blade 32 and a hot blade 33 or otherwise with the neutral blade 32, the hot blade 33 and a ground pin 34, and the neutral blade 32, the hot blade 33 and the ground pin 34 are electrically connected to the electric power cords 21 in the electric power line 2, respectively; besides that, one side of the seat body 31 has an accommodation recess 311.

In addition, the connection assembly 4 can be fixedly locked to the plug front end assembly 3 through the locking element 6, and the connection assembly 4 includes a positioning part 41 which internally has a through hole 411 penetrating through the connection assembly 4; also, a positioning hole 412 commutatively connecting to the through hole 411 is further installed through the positioning part 41, and the front end of the light guiding line 22 can enter the through hole 411 such that the front end of the light guiding line 22 can be fixed within the through hole 411 by means of the stopper 221 installed at the front end of the light guiding line 22.

Meanwhile, a fixing pillar 7 is disposed in the positioning hole 412 and presses upon the light guiding line 22 in the through hole 411 such that the front end of the light guiding line 22 can be fixedly positioned within the through hole 411.

Furthermore, the light emitting circuit assembly 5 is installed inside the accommodation recess 311 of the seat body 31 and located between the plug front end assembly 3 and the connection assembly 4, in which the light emitting circuit assembly 5 is set up with at least a light emitting diode (LED) 51 which faces towards the light guiding line 22 in the through hole 411, and the light emitting circuit assembly 5 also includes at least two power supply cords 52 which are respectively connected in parallel to the electric power cords 21 in the electric power line 2 such that, when the electric power cords 21 in the electric power line 2 conduct electric power, the LED 51 of the light emitting circuit assembly 5 can become conductive and emit light.

Also, the plug accommodation body 1 may be integrally injection formed with a mold such that the plug front end assembly 3, the connection assembly 4 and the light emitting circuit assembly 5 are conjunctively enveloped and contained in the plug accommodation body 1.

Figure 2:
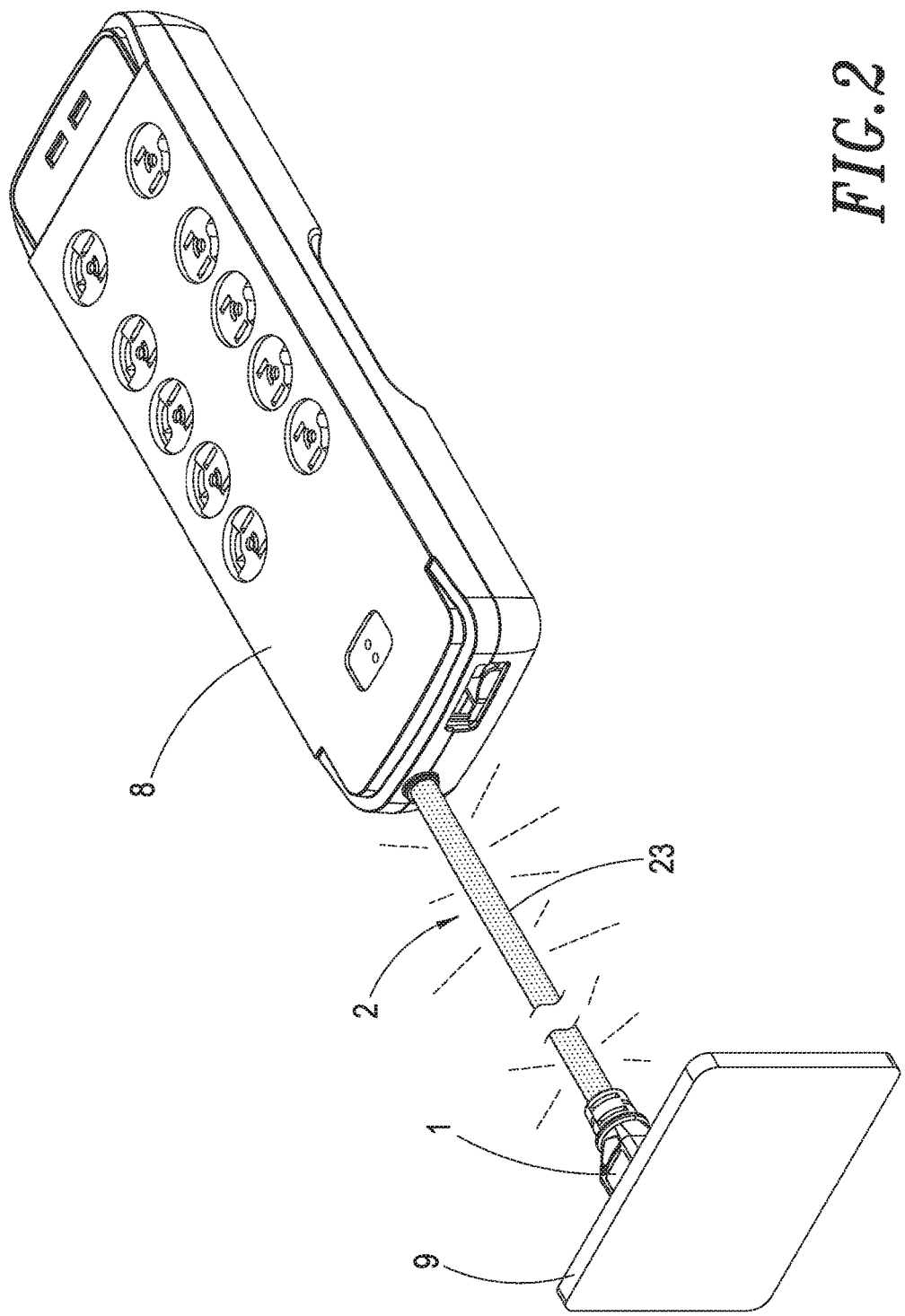
FIG. 2 shows an application embodiment view of the light emitting power line plug structure according to the present invention.

Furthermore, as shown in FIG. 2, the other end of the electric power line 2 is connected to a device 8 (herein the device 8 may be any electronic device or power outlet requiring power supply via the electric power line), so, once the plug front end assembly 3 is inserted into the electric power socket 9, the electric power cords 21 in the electric power line 2 can conduct electricity such that the LED 51 of the light emitting circuit assembly 5 can be electrically conducted and generate light, and the light guiding line 22 can integrally illuminate by means of light transfer feature so that the entire electric power line 2 can glow outwards through the translucent cladding 23.

Figure 3:
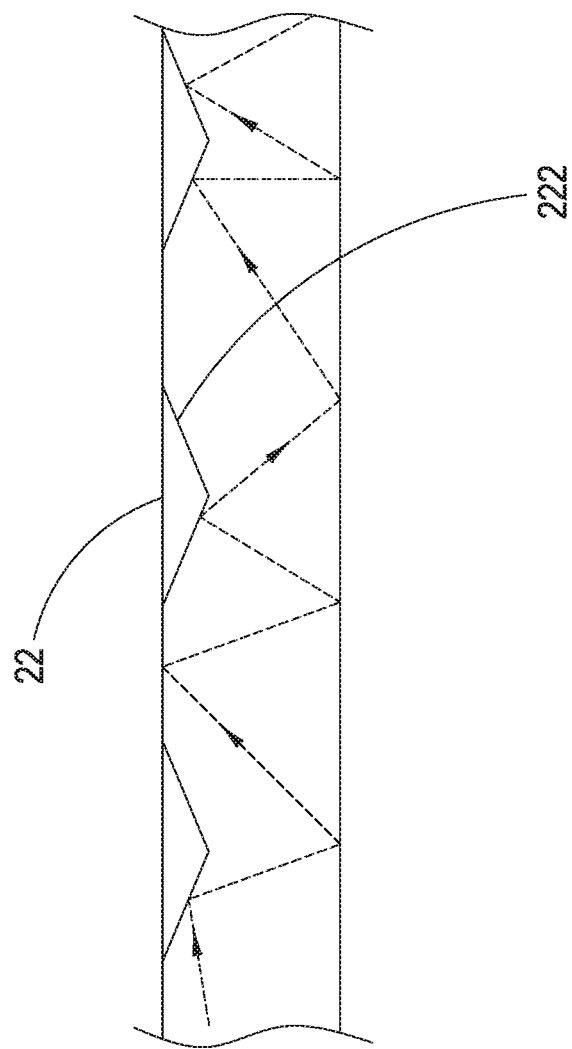
FIG. 3 shows a light transfer view within the light guiding line of the emitting power line plug structure according to the present invention.

Besides that, as shown in FIG. 3, a zigzag component 222 is installed inside the light guiding line 22 so that light can exhibit non-straight-lined transfers within the light guiding line 22, and such non-straight-lined transfers enable the light guiding line 22 to present flow-like translucent illuminations on the entire the electric power line 2.

In comparison with other conventional technologies, the light emitting power line plug structure according to the present invention provides the following advantages:

the present invention allows to bury a light guiding line in the electric power line so that, upon inserting the power plug into a power supply socket, the light guiding line can generate light, and such light generated by the light guiding line can travel through the electric power line thereby letting the user see an illuminating electric power line;

in the present invention, the light emitting circuit and the light guiding line are both installed inside a conventional electric power line, so it does not need to significantly modify the structure of the electric power line to enable the electric power line to have the intended electric conductivity and illumination effects.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alternations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A light emitting power line plug structure, comprising:
  a plug accommodation body, internally including an accommodation space;
  an electric power line, communicatively connected to the plug accommodation body, wherein the electric power line has a plurality of electric power cords, at least one light guiding line, and a translucent cladding, the plurality of electric power cords and the at least one light guiding line are disposed inside the translucent cladding, and front ends of the plurality of electric power cords and the at least one light guiding line penetrate into the accommodation space, and a front end of the at least one light guiding line is combined with a stopper;

a plug front end assembly, located within the accommodation space of the plug accommodation body, including a seat body, a neutral blade, and a hot blade, wherein the neutral blade and the hot blade are connectedly installed on the seat body and electrically connected to the plurality of electric power cords in the electric power line, and one side of the seat body is configured with an accommodation recess;

a connection assembly, located within the accommodation space of the plug accommodation body and fixedly locked to the plug front end assembly, wherein the connection assembly includes a positioning part, and an inside of the positioning part has a through hole going through the connection assembly, and a positioning hole commutatively connecting to the through hole is further installed through the positioning part, and the front end of the light guiding line enters the through hole such that the front end of the at least one light guiding line is fixed within the through hole by means of the stopper installed at the front end of the at least one light guiding line; and a light emitting circuit assembly, installed in the accommodation recess of the seat body and located between the plug front end assembly and the connection assembly, wherein the light emitting circuit assembly is configured with at least one light emitting diode (LED) facing towards the at least one light guiding line within the through hole, and the light emitting circuit assembly includes at least two power supply cords respectively connected in parallel to the plural of electric power cords in the electric power line such that, when the plural of electric power cords in the electric power line conduct electric power, the at least one LEDs of the light emitting circuit assembly is electrically conducted and generates light and the at least one light guiding line integrally illuminates by means of light transfer feature so that the entire electric power line glows outwards through the translucent cladding.

2. The light emitting power line plug structure according to claim 1, wherein the plug front end assembly further includes a ground pin, and the ground pin is connectedly installed on the seat body and electrically connected to the plural of electric power cords in the electric power line.

3. The light emitting power line plug structure according to claim 1, wherein the at least one light guiding line is made of a light fiber line material.

4. The light emitting power line plug structure according to claim 1, wherein a zigzag component is installed inside the at least one light guiding line such that light exhibits non-straight-lined transfers within the at least one light guiding line.

5. The light emitting power line plug structure according to claim 1, further comprising a fixing pillar disposed in the positioning hole and pressing upon the at least one light guiding line in the through hole such that the front end of the at least one light guiding line can be fixedly positioned within the through hole.

* * * * *